United States Patent Office 2,914,570
Patented Nov. 24, 1959

2,914,570

HYDROXYNITROSTILBENES

Dale N. Robertson, Midland, Mich., assignor to The Dow Chemical Company, Midland, Mich., a corporation of Delaware No Drawing. Application October 18, 1956
Serial No. 616,657

5 Claims. (Cl. 260—619)

This invention relates to nitroethylenes having the structure

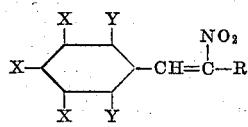

In this and succeeding formulae, one X symbol represents hydroxyl, and the other X symbols and the Y symbols each is selected from the group consisting of hydrogen, halogen, nitro, phenyl, and a lower alkyl radical containing from 1 to 4 carbon atoms, inclusive, and R represents an aryl radical of the benzene series. The expression "aryl radical of the benzene series" as herein employed refers to phenyl and substituted phenyl radicals such as 4-tertiary-butylphenyl-, 4-chlorophenyl-, 3-nitrophenyl-, 2,4-dinitrophenyl-, 4-fluorophenyl-, 4-iodophenyl-, 4-nitrophenyl-, 2,4,6-trimethylphenyl-, 4-ethylphenyl-, 4-ethoxyphenyl-, 3,4-dimethoxyphenyl- and 4-phenylphenyl-. The products of this invention are yellow or orange colored crystalline solids soluble in organic solvents such as ethanol, acetone, xylene and kerosene and substantially insoluble in water. The products are useful as toxic ingredients in compositions adapted to be employed for the control of bacteria and fungi such as in germicidal soap compositions and in the preservation of cellulosic textiles. They are also useful as agricultural chemicals and as insecticides. In addition, these compounds are useful as chemical intermediates.

The products of this invention may be prepared by the reaction of (1) a Schiff base having the structure

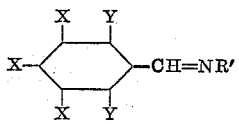

wherein R' is a lower alkyl radical containing from 3 to 6 carbon atoms, inclusive, with (2) a nitromethane compound having the structure

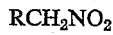

The Schiff base reactant may be prepared by condensing an appropriate aldehyde having the formula

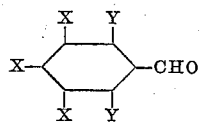

with a primary amine having the formula

wherein R' is as above defined. It is convenient to prepare the Schiff base as a first step in the synthesis of the nitroethylene.

In the preferred method for carrying out this reaction, the aldehyde and a primary alkyl amine such as normal-butylamine are mixed in a water-immiscible organic solvent such as benzene or cyclohexane. Good results are obtained when substantially equimolar quantities of the reactants or a slight excess of the amine are employed. The resulting mixture is heated to distill out the water of reaction substantially as formed as an azeotropic mixture. After completion of the reaction, the remaining solvent and excess amine, if employed, are removed by distillation and the Schiff base recovered as residue. The latter may be purified by conventional means, if desired.

In the second step of the reaction, the Schiff base and the nitromethane compound are mixed together in a substantially anhydrous lower alkanoic acid such as acetic, propionic or butyric acid. Substantially equimolar proportions of the Schiff base and nitromethane compound and a molar excess of the alkanoic acid are employed. The preferred excess of the acid is from 2 to 3 molar excess. The resulting mixture is allowed to stand at room temperature, that is, from about 20° to 40° C., to allow the reaction to proceed. The reaction is usually substantially complete in several hours but the mixture may be allowed to stand for several days without detriment. The product frequently precipitates in the reaction mixture. However, a supersaturated solution of the product may be formed and scratching the reaction vessel or seeding the mixture may be necessary to initiate precipitation. Alternatively, the entire mixture may be poured into water to precipitate the desired product.

The time required for the reaction of the Schiff base and nitromethane compound as discussed above may be further decreased for the preparation of many of the nitroethylenes by heating the reaction mixture to or near the boiling point for a period of from 1 to 5 minutes and then pouring the mixture into ice and/or water to precipitate the desired product.

The following examples illustrate the invention but are not to be construed as limiting:

EXAMPLE 1

3-hydroxy-α'-nitrostilbene

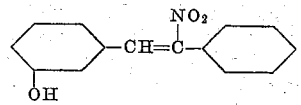

10 milliliters (0.1 mole) of normal-butylamine was added to a slurry of 12.2 grams (0.1 mole) of 3-hydroxybenzaldehyde in 75 milliliters of benzene. The resulting mixture was heated to distill out the water of reaction as a benzene-water azeotrope. After all the water was removed, the mixture was allowed to cool whereupon a solid started to precipitate in the flask. The mixture was reheated to dissolve substantially all of the precipitate and filtered while hot and then allowed to stand. On cooling, an N-(3-hydroxybenzylidene)-normal-butylamine product precipitated as fine needles. The latter was recovered by filtration, washed with benzene and air-dried to obtain a purified product melting at 123.6°–124.2° C. The yield of the product amounted to 11.1 grams or 62.6 percent of theoretical. The product contained 7.47 percent nitrogen. The theoretical value for the latter is 7.90 percent.

8.9 grams (0.05 mole) of the Schiff base above prepared was added to a mixture of 6.9 grams (0.05 mole) of phenyl nitromethane and 25 milliliters of glacial acetic acid. The Schiff base dissolved readily and the mixture turned yellow immediately. The latter was allowed to stand at room temperature in the dark for several hours, and then poured into ice-water to precipitate an oil which slowly solidified on standing. The solid was recovered by filtration, washed with water, and recrystallized from dilute acetic acid to obtain a 3-hydroxy-α'-nitrostilbene product melting at 120° to 125° C.

EXAMPLE 2

*4-hydroxy-α'-nitrostilbene*

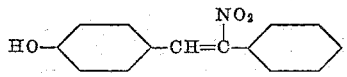

12.2 grams (0.1 mole) of 4-hydroxybenzaldehyde was treated with 10 milliliters (0.1 mole) of normal-butylamine and 75 milliliters of benzene. The resulting mixture was heated to distill off the water of reaction as a benzene-water azeotrope. The remaining benzene was distilled out under reduced pressure to obtain an N-(4-hydroxybenzylidene)-normal-butylamine product as a red syrupy residue.

13.7 grams (0.1 mole) of phenylnitromethane was added to the above residue. 20 milliliters of glacial acetic acid was then added and the mixture gently agitated. An exothermic reaction took place. An additional 10 milliliters of acetic acid was then added and the resulting mixture allowed to stand at room temperature for about one week. At the end of this period, the mixture was poured into water to precipitate a 4-hydroxy-α'-nitrostilbene product. The latter was recrystallized from ethanol to obtain orange needles melting at 144.5–147° C.

EXAMPLE 3

*2,6-dichloro-3-hydroxy-α'-nitrostilbene*

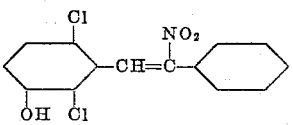

6.5 grams (0.034 mole) of 2,6-dichloro-3-hydroxybenzaldehyde, 75 milliliters of benzene and 5 milliliters (0.05 mole) of normal-butylamine were mixed together and the resulting mixture heated to distill off the water of reaction as a benzene-water azeotrope. The remaining benzene and excess amine were distilled out under reduced pressure to obtain an N-(2,6-dichloro-3-hydroxybenzylidene)-normal-butylamine product as a viscous residue.

4.66 grams (0.034 mole) of phenylnitromethane and 30 milliliters of glacial acetic acid were added to the above residue and the resulting mixture warmed on a steam bath for a few minutes. The mixture was then allowed to stand in the dark for about 24 hours and thereafter poured into water and ice while stirring to precipitate a solid. The resulting mixture was allowed to stand about 0.5 hour, and filtered to obtain a 2,6-dichloro-3-hydroxy-α'-nitrostilbene product. The latter was washed with water and dried overnight over phosphorous pentoxide under reduced pressure. The yield of the product was 9.6 grams or 91 percent of theoretical. The product after recrystallization from ethanol melted at 170°–171.3° C.

EXAMPLE 4

*3-bromo-4-hydroxy-α'-nitrostilbene*

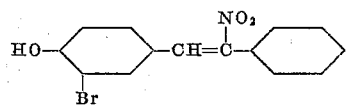

10 milliliters (0.1 mole) of normal-butylamine is added to a slurry of 20.1 grams (0.1 mole) of 3-bromo-4-hydroxybenzaldehyde in 75 milliliters of benzene. The resulting mixture is heated to distill out the water of reaction as a benzene-water azeotrope. The remaining benzene is distilled out under reduced pressure to obtain an N - (3 - bromo-4-hydroxybenzylidene)-normal-butylamine product as residue.

13.7 grams (0.1 mole) of phenylnitromethane and 25 milliliters of glacial acetic acid is added to the Schiff base prepared above and the resulting mixture heated for a few minutes and then poured into water to precipitate the desired product. The mixture is filtered to obtain a solid 3-bromo-4-hydroxy-α'-nitrostilbene product having a molecular weight of 320.2.

EXAMPLE 5

*3-bromo-2'-chloro-4-hydroxy-α'-nitrostilbene*

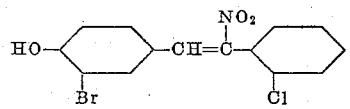

In a manner similar to that described in Example 4, an N - (3 - bromo-4-hydroxybenzylidene)-normal-butylamite product is prepared from 20.1 grams (0.1 mole) of 3-bromo-4-hydroxybenzaldehyde and 10 milliliters (0.1 mole) of normal-butylamine. 17.2 grams (0.1 mole) of 2-chlorophenylnitromethane and 25 milliliters of glacial acetic acid are added to the above residue and the resulting mixture stirred and allowed to stand for 24 hours in the dark. The mixture is then poured into ice and water to precipitate a solid product. Thereafter, the mixture is filtered to obtain a 3-bromo-2'-chloro-4-hydroxy-α'-nitrostilbene product having a molecular weight of 354.6.

EXAMPLE 6

In a similar manner the following nitroethylenes are prepared:

2,2'-dichloro - 3 - hydroxy - α',4 - dinitrostilbene having a molecular weight of 355.1 by the reaction of 2-chloro - 3 - hydroxy-4-nitrobenzaldehyde with normal-propylamine to obtain an intermediate N-(2-chloro-3-hydroxy - 4 - nitrobenzylidene) - normal - propylamine product, followed by the reaction of the latter with 2-chlorophenylnitromethane in glacial acetic acid.

2-ethyl-4-hydroxy-α',4'-dinitrostilbene having a molecular weight of 314.3 by the reaction of 2-ethyl-4-hydroxybenzaldehyde with normal-amylamine to obtain an intermediate N - (2-ethyl-4-hydroxybenzylidene) - normal-amylamine product followed by the reaction of the latter with 4-nitrophenylnitromethane in propionic acid.

4'-ethyl-4-hydroxy-2-iodo - α' - nitrostilbene having a molecular weight of 395.2 by the reaction of 4-hydroxy-2-iodobenzaldehyde with normal-butylamine to obtain an intermediate N-(4-hydroxy-2-iodobenzylidene)-normal-butylamine product followed by the reaction of the latter with 4-ethylphenylnitromethane in glacial acetic acid.

The products of this invention are useful as chemical intermediates in the synthesis of other compounds such as for example, hydroxyaralkylamines. In addition, these compounds are adapted to be employed as toxic constituents in germicidal and parasiticidal compositions. In a representative operation, complete controls were obtained when nutrient agar media saturated with 4-hydroxy-α'-nitrostilbene were streaked with *Staphylococcus aureus* and *Rhizopus nigricans* and incubated at 30° C. for three days.

The nitromethane compounds employed as starting materials in the preparation of the nitroethylenes of this invention may be prepared by reacting an appropriate benzyl bromide having the structure .

with sodium nitrite for several hours in a solvent such as dimethylformamide at a temperature of from —20° to —15° C. The fluorophenylnitromethanes employed in the preparation of certain of the nitroethylenes are described and claimed in a copending application filed concurrently herewith as Serial No. 616,655, in the name of Dale N. Robertson.

A preferred method for preparing the compounds of the present invention is the subject of a copending application, Serial No. 616,652, of Dale N. Robertson filed concurrently herewith, now U.S. Patent No. 2,899,429.

I claim:
1. A nitroethylene having the formula

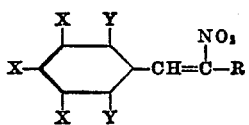

wherein the structure

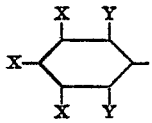

is a radical selected from the group consisting of monohydroxyphenyl, monohydroxy-monohalophenyl, monohydroxy-dihalophenyl, monohydroxy - mono - lower - alkylphenyl, monohydroxy-mononitrophenyl and monohydroxy-monohalo-mononitrophenyl, in which radical one X symbol represents hydroxy and the other X symbols and the Y symbols each are selected from the group consisting of hydrogen, halo, nitro and lower alkyl containing from 1 to 4 carbon atoms, inclusive; and R represents a radical selected from the group consisting of phenyl, 4-tertiary-butylphenyl-, 4-chlorophenyl-, 3-nitrophenyl-, 2,4-dinitrophenyl-, 4-fluorophenyl-, 4-iodophenyl-, 4-nitrophenyl-, 2,4,6-trimethylphenyl, 4-ethylphenyl, 4-ethoxyphenyl-, 3,4-dimethoxyphenyl-, 4-phenylphenyl- and 2-chlorophenyl-.
2. 3-hydroxy-α'-nitrostilbene.
3. 4-hydroxy-α'-nitrostilbene.
4. 2,6-dichloro-3-hydroxy-α'-nitrostilbene.
5. 3-bromo-4-hydroxy-α'-nitrostilbene.

References Cited in the file of this patent
UNITED STATES PATENTS
2,100,228    Tinker et al. _____ Nov. 23, 1937

OTHER REFERENCES
Hewitt et al.: Jour. Chem. Soc. Trans., vol. 101 (1912), pages 604–608 (5 pages).
Stewart et al.: Can. Jour. Research, vol. 26B (1948), pages 7–10 (4 pages).